Jan. 13, 1925.  
M. C. UKMAN  
CORE FOR TIRES  
Filed Nov. 17, 1923

1,523,043

Inventor:
Max C. Ukman,
His Attorneys.

Patented Jan. 13, 1925.

1,523,043

UNITED STATES PATENT OFFICE.

MAX C. UKMAN, OF ST. LOUIS, MISSOURI.

CORE FOR TIRES.

Application filed November 17, 1923. Serial No. 675,397.

*To all whom it may concern:*

Be it known that I, MAX C. UKMAN, a citizen of the United States, residing at the city of St. Louis and State of Missouri, have invented a new and useful Core for Tires, of which the following is a specification.

This invention relates to vehicle tires, and consists in the novel construction hereinafter disclosed.

An object of the invention is to provide a resilient core to constitute a filler for the ordinary tire casing which will give sufficient support thereto and at the same time render the tire resilient to a degree sufficient to adapt it for use in connection with motor vehicles.

Another object of the invention is to provide a built up core for tire casings, comprising an inner elastic member forming a support for a series of longitudinal strands of rope bound together and having a spirally wound outer layer of rope, whereby the core is made durable for use as a cushion support for the tire casing.

Additional advantages of the invention will be apparent from the following detailed description thereof taken in connection with the accompanying drawing, in which—

Figure 1:
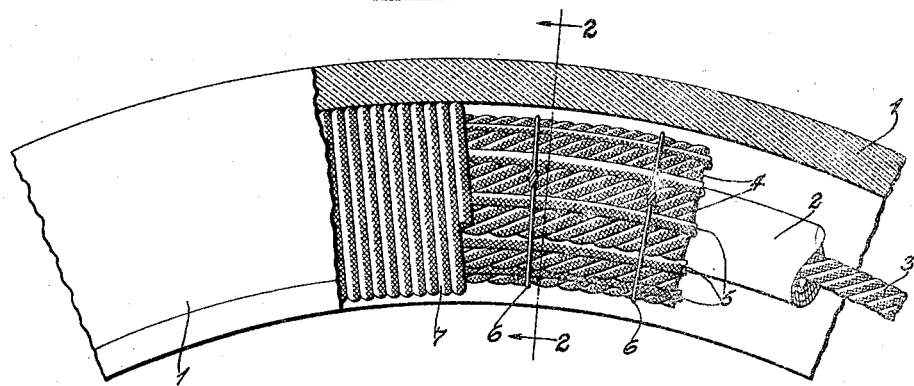
Fig. 1 is a side elevation of a section of the tire, partially in section, illustrating the invention.
Figure 2:
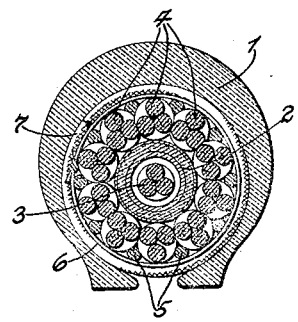
Fig. 2 is a cross sectional view on the line 2—2 of Fig. 1.

In the embodiment of the invention illustrated in the drawing the filler for the tire casing 1 is shown as built up from an inner tubular core 2, said core 2 comprising a rubber composition, or combination of rubber and fabric tubing arranged in a circular form and having separated ends lying adjacent to each other.

Within the member 2 there may be mounted a length of plural strand rope 3 such as manila rope, or the like. The member 3 is of slightly less cross diameter than the inner opening of the tube 2, so that there will be some radial movement in the tube affording an inner resilient support for the core. At the same time the member 3 prevents undue radial movement of the core 2, thereby providing against undue wear of the wall of the core.

Arranged around the core 2 and running longitudinally therewith is a series of plural strand lengths of rope 4, and intermediate the lengths of rope 4 are lengths of smaller rope or cord 5. The members 4 and 5 provide together a reinforcing resilient wall around the core 2 and, in order to hold said elements in compact assembly, a plurality of bands of wire 6 are disposed at spaced intervals. The bands 6 of wire securely tie the structure together.

A reinforcing outer layer comprising a long length of cord 7 is spirally wound around the inner structure. The element 7 is of relatively small diameter so that when the same is laid in place it will tightly bind the structure together and provide a relatively smooth outer surface for contact with the inner wall of the casing.

A filler made up as described may be readily inserted in the standard tire casing and will afford a very durable cushion support for the casing. It may be easily removed from the casing and mounted again in another casing when the casing is worn.

The structure has the advantage of being practically indestructible, of possessing sufficient resiliency to cause smooth riding of the vehicle equipped with tires of the structure, of being cheap in construction, and of being readily mounted and dismounted from the standard tire casing.

What I claim and desire to secure by Letters Patent is:—

1. A vehicle tire, comprising in combination a casing, a filler for said casing comprising an inner elastic tube, a filler for said tube comprising a length of rope inserted therein, said rope being of less diameter than the opening of the tube to permit movement of the tube wall, a plurality of rope lengths arranged parallel with each other around said tube, retaining bands around said lengths constituting binding means for holding the parts in adjustment, and an outer wall wound around said rope lengths.

2. A filler core for tire casings comprising an inner tubular member, a filler within said tubular member, a series of spaced rope lengths arranged longitudinally around said core and disposed in parallel relation with one another, a second series of rope lengths of small diameter interposed between said longitudinal rope lengths and said tubular member, means for binding said lengths together, and a plurality of turns of rope spirally wound around said structure including said binding means.

MAX C. UKMAN.